United States Patent [19]

Singer

[11] Patent Number: 5,034,963

[45] Date of Patent: Jul. 23, 1991

[54] APPARATUS FOR VISUALLY AIDING MSK DETECTION AND INTERFERENCE RECOGNITION AND CLASSIFICATION

[75] Inventor: Paul A. Singer, San Diego, Calif.

[73] Assignee: The United States of America as represented by the Secretary of the Navy, Washington, D.C.

[21] Appl. No.: 539,098

[22] Filed: Jun. 14, 1990

[51] Int. Cl.$^5$ .............................................. H04B 10/08
[52] U.S. Cl. ........................................ 375/10; 375/75; 455/67; 455/226
[58] Field of Search .............................. 375/10, 75, 76; 371/20.1, 20.4; 455/67, 226, 263; 364/481; 334/33; 331/64

[56] References Cited

U.S. PATENT DOCUMENTS

| | | | |
|---|---|---|---|
| 3,750,177 | 7/1973 | Rooks | 455/226 |
| 3,992,617 | 11/1976 | Epstein | 375/90 |
| 4,020,283 | 4/1977 | Epstein | 375/90 |
| 4,028,490 | 6/1977 | Epstein | 375/90 |
| 4,072,905 | 2/1978 | Keelty | 375/90 |
| 4,195,262 | 3/1980 | King | 455/67 |
| 4,414,675 | 11/1983 | Comroe | 375/90 |
| 4,449,223 | 5/1984 | Liskov et al. | 375/10 |
| 4,569,061 | 2/1986 | Breitwisch | 375/90 |
| 4,833,690 | 5/1989 | Zuranski et al. | 375/10 |

Primary Examiner—Benedict V. Safourek
Assistant Examiner—Young Tse
Attorney, Agent, or Firm—Harvey Fendelman; Thomas Glenn Keough

[57] ABSTRACT

An apparatus provides patterns for visually aiding an operator in determining the nature and noise environment of the incoming signal. A conventional signal receiver and an oscilloscope are coupled to a pair of phase detectors, a clock circuit, a reference circuit, and a timing circuit. The clock circuit synchronizes the operation of the receiver, reference circuit, and timing circuit. The phase detectors have pair of inputs and an output with the inputs of one detector being connected to the receiver and the reference circuit, and its output is connected to the Y deflection axis of the oscilloscope screen. The inputs of the other detector are connected to the receiver and the output of the reference circuit via a preselected analog time delay, and its output is connected to the X deflection axis of the oscilloscope screen. The output of the timing circuit is connected to the Z intensity axis of the oscilloscope screen for a preselected time duration to provide the capability to vary the intensity of a part of the screen such that patterns are generated on the oscilloscope screen representing the presence of some constituents and the inherent nature of the incoming signal which might include, the type of noise, the presence of doppler shift or CW interference, or drift of a component.

9 Claims, 3 Drawing Sheets

APPARATUS FOR VISUALLY AIDING MSK DETECTION AND INTERFERENCE RECOGNITION AND CLASSIFICATION

STATEMENT OF GOVERNMENT INTEREST

The invention described herein may be manufactured and used by or for the Government of the United States of America for governmental purposes without the payment of any royalties thereon or therefor.

BACKGROUND OF THE INVENTION

The detection of a signal of interest and the discernment of noise and its constituency have always been of high interest to those who must assure reliable communications. These considerations are foremost in the minds of operators of very low frequency (VLF) systems since systems of this type have been selected to convey information that is most important. Any delays in recognizing information and various interferences could have severe consequences. So the need continues for an apparatus for visually aiding a rapid analysis of incoming signals, such as VLF, and, more particularly, the detection, interference recognition and classification of minimum shift keying (MSK) signals in incoming VLF signals.

A VLF receiving terminal operator sitting at a console must determine the nature and electromagnetic noise environment of the incoming signal usually without any previous knowledge about the signal. One prior art approach relies upon the use of trained operators who listen to audio outputs and develop an "ear" for judging the incoming signal traffic. A main drawback of this approach is that its success is contingent solely upon the level of operator skill which inherently varies from one individual to the next. Furthermore, the audio monitoring of signals for a period of time can be tedious and fatigue may set in to compromise performance.

Another prior art approach to improve performance is to give an operator a visual indication by employing a spectrum analyzer to "see" the frequency characteristic of the environment. Drawbacks of this approach are that it has relatively slow response and requires considerable expensive equipment.

In view of the aforementioned drawbacks of these prior art approaches, a continuing need exists in the state of the art for a cost effective visual monitoring of a signal of interest to aid a receiving terminal operator in the task of identifying signals of interest and of determining the nature and noise environment of incoming signals.

SUMMARY OF THE INVENTION

The present invention is directed to providing a cost effective apparatus for visually aiding an operator in the detection of MSK signals and interference signal recognition and classification thereof in an incoming VLF signal. Low cost for the capability is assured since some of its expensive components, i.e. a VLF receiver, frequency time standard and oscilloscope, are already on board to function in their intended role. Advantageously, the apparatus is uncomplicated and shows quick response to changes. A pair of phase detectors, one of which receives a signal delayed 90° with respect to the other, has their respective outputs connected to the X and Y axes input terminals of the oscilloscope to provide representative waveforms. A timing circuit has its output connected to the Z axis of the oscilloscope and is actuated for preselected time durations to vary the intensity of the waveforms on the oscilloscope screen. The generated patterns on the screen visually represent the signal of interest, the presence of doppler shift in the signal of interest, the type of noise, or CW interference, and other information concerning the inherent nature of the incoming signal and, as such, the patterns give a real-time visual aid for an operator.

Another object of the invention is to provide an apparatus which provides a visual indication of signals of interest.

An object of the invention is to provide an apparatus which provides a visual output for aiding a receiver operator.

Another object of the invention is to provide an apparatus for generating patterns on an oscilloscope screen which visually aid the operator in determining the nature and noise environment of an incoming signal.

Still another object of the invention is to provide an apparatus which advantageously includes other components already available in the signal receiving system where the apparatus will be used.

A further object of the invention is to disclose an apparatus which is uncomplicated to improve reliability, has a quick response to change and is cost effective.

These and other objects, advantages and novel features of the invention will become more readily apparent from the ensuing specification and claims when considered in conjunction with the accompanying drawings.

DETAILED DESCRIPTION OF THE INVENTION

Figure 1:
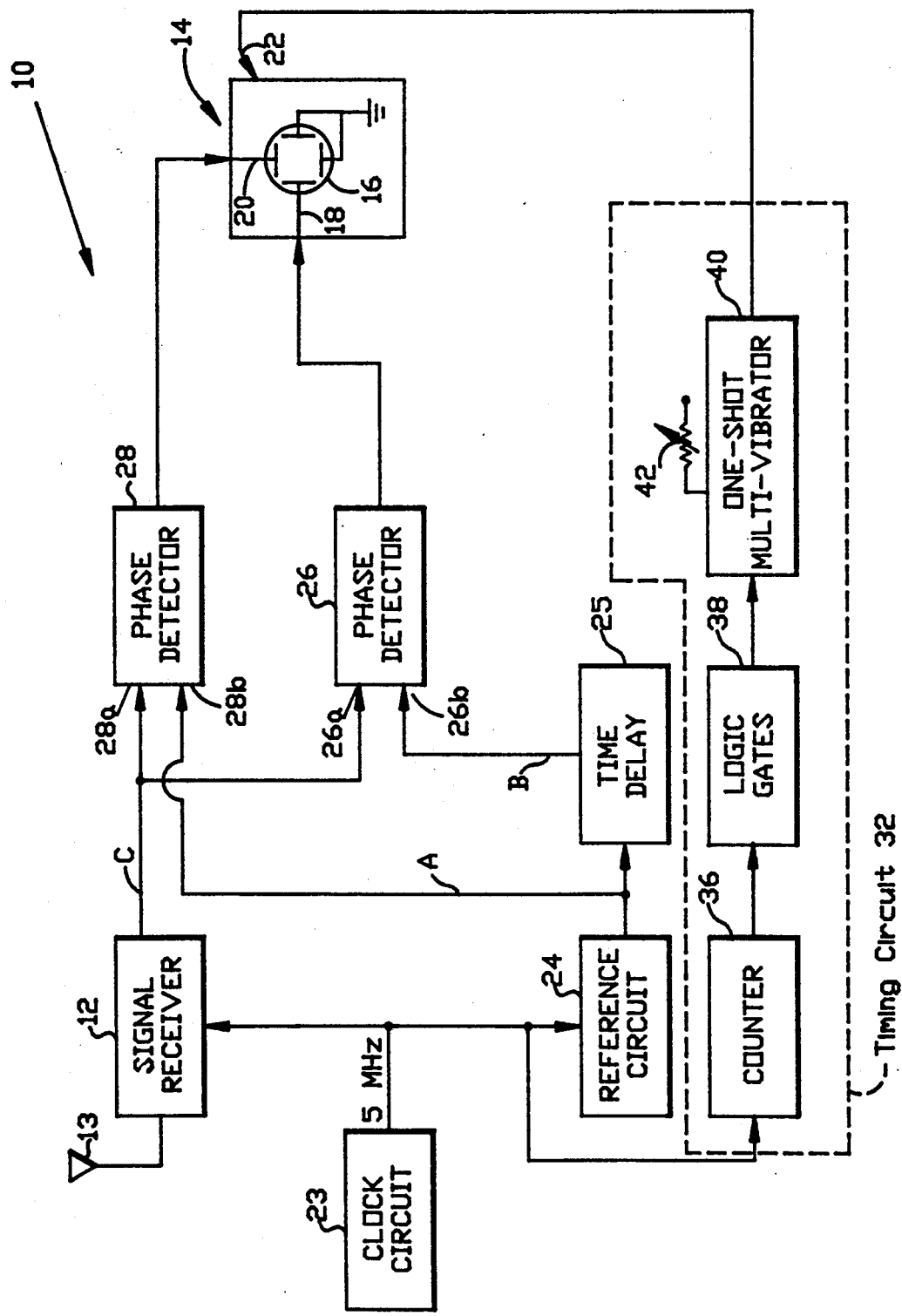
FIG. 1 is a block diagram of an apparatus fabricated in accordance with the teachings of this inventive concept.

Referring now to FIG. 1 of the drawings, an apparatus 10, is provided herein that visually aids a radio receiving terminal operator in determining the nature and noise environment of an incoming signal of interest. Its use to aid an operator receiving VLF signals, particularly in MSK detection and interference recognition and classification, will herein be elaborated on. It being understood, however, that in accordance with the principles of the present invention, many receivers of a variety of spectrums with other modulation schemes could advantageously employ this concept.

Apparatus 10 is fabricated to rely on the utilization of some of the most costly components which are already included at a receiver station. These include a VLF signal receiver 12 for receiving an incoming signal via an antenna 13, and an oscilloscope 14. The receiver could be any one of a variety of commercially available models, such as, a Type Number R-1738/WR marketed by Rockwell Corporation of Richardson, Tex. 75018 and the antenna could be any of many designs.

Oscilloscope 14 has a display screen 16 that appropriately displays the information fed to the oscilloscope on an X deflection input terminal 18, Y deflection input terminal 20 and Z deflection input terminal 22 for defining X, Y and Z axes thereon. The oscilloscope may be one selected from numerous suppliers but the unit selected must have the capability to provide the X and Y information on orthogonal axes and the Z axis information by being able to change its intensity.

The apparatus has a clock circuit 23 for assuring proper operation. A frequency time standard unit marketed as a Model 0-1695/U by Hewlett-Packard Corporation, Palo Alto, Calif. 94303 was selected. It feeds a 5 Mhz. signal to a reference circuit 24 of a reference circuit means that also includes a conventional analog time delay 25.

A typical reference circuit 24 used in accordance with the teachings of this inventive concept might be a Model 8660 by Hewlett-Packard Corporation, Palo Alto, Calif. 94303, which provides the necessary capability to appropriately down convert the 5 MHz. signal to a 7.5 KHz. signal A. The 7.5 KHz signal A from the reference circuit is fed to analog time delay 25 which, in this case, is an analog delay line to impart a 33.3 microsecond time delay to accordingly create a 90° phase shifted 7.5 KHz signal B. Other suitable time delays for other intermediate frequencies of interest can be created as needed by appropriate selection of components in accordance with the teachings of this inventive concept.

Figure 2:
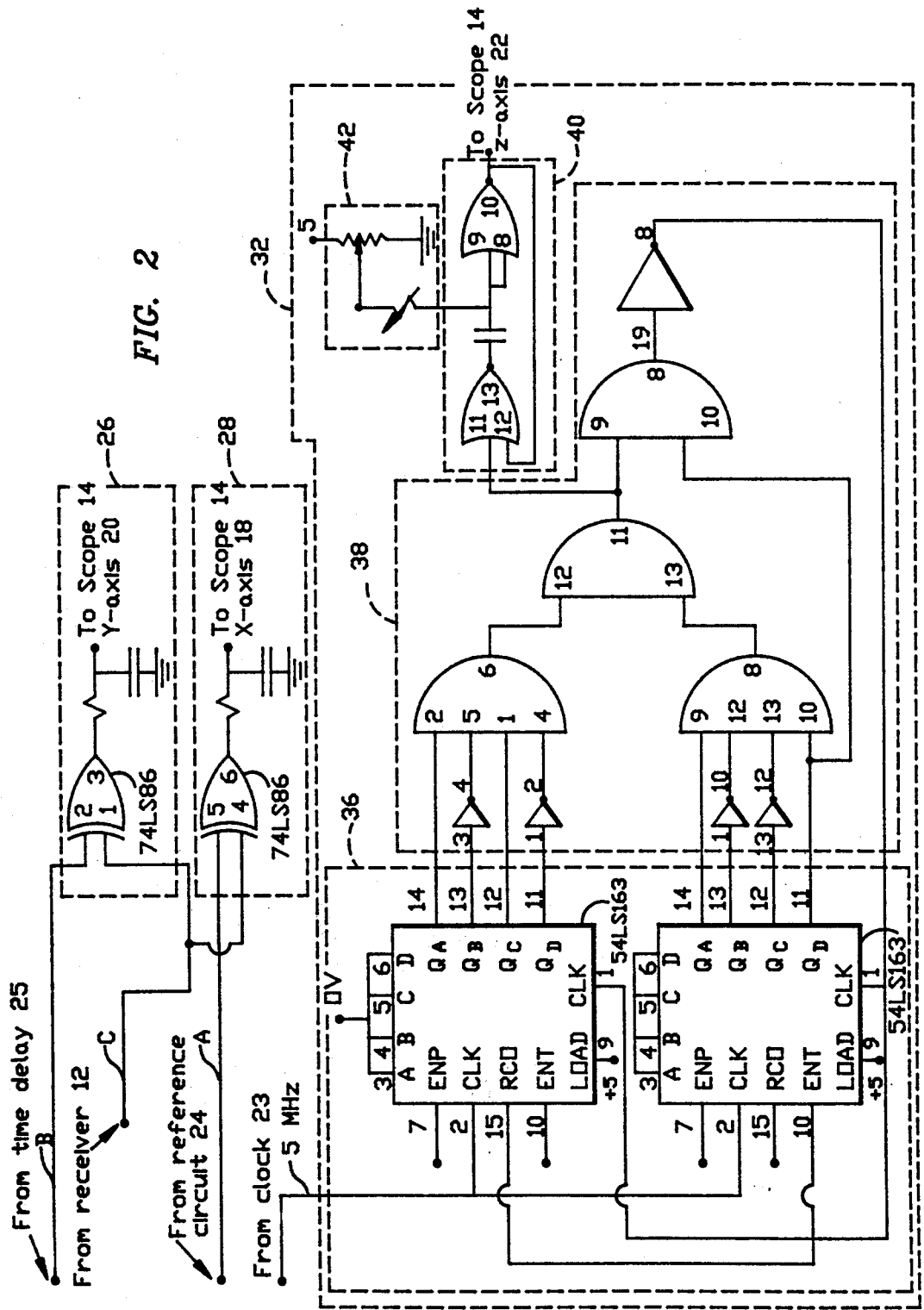
FIG. 2 is a block diagram representation of some of the constituents of FIG. 1.

Looking to FIGS. 1 and 2, the unshifted 7.5 KHz. signal A, shifted 7.5 KHz. signal B and the intermediate frequency, or signal of interest C from signal receiver 12 are coupled to phase detectors 26 and 28 which provide the Y and X inputs to terminals 20 and 18. Phase detectors 26 and 28 are implemented by standard exclusive-OR gates each having a pair of inputs 26a and 26b or 28a and 28b, respectively, which are interconnected as depicted in FIG. 2.

A timing circuit 32 is made up of a counter 36 coupled to receive the 5 MHz. clock signal from clock 23. An interconnected logic gate circuit 38 and a one shot multivibrator circuit 40 with a timing circuit 42 provides the appropriate Z axis signal for oscilloscope 14 in a manner to be elaborated on below. The circuit diagram of FIG. 2 sets forth the details of the timing circuit.

Clock circuit 23 is connected to appropriately actuate receiver 12, reference circuit 24, and timing circuit 32 to assure the synchronized operation thereof. Inputs 28a of phase detector 28 and 26a of phase detector 26 are connected to receive the intermediate frequency, or signal of interest C from signal receiver 12. Input 28b of phase detector 28 is coupled to receive the in-phase component A of the 7.5 KHz. signal from reference circuit 24 and input 26b is coupled to receive the 90° phase shifted component B from reference circuit 24 via time delay 25. As mentioned above, the output of phase detector 28 is connected to terminal 20 for the Y axis deflection on oscilloscope display screen 16 and the output of phase detector 26 is connected to terminal 18 for the X axis deflection on oscilloscope display screen 16.

By way of this example which is intended to be for the purposes of demonstration only and is not to be construed as being limiting, VLF signal receiver 12 produces an intermediate frequency or frequency of interest output signal C that may be at 7.5 KHz. Clock circuit 23 produces a 5 MHz. signal so that reference circuit 24 down converts the 5 MHz. signal from clock circuit 23 to the substantially the same frequency A as the receiver intermediate frequency C, e.g. 7.5 KHz., which is fed to input 28b of phase detector 28. The 90° phase shifted component B at the output of time delay 25 which is fed to input 26b of phase detector 26.

The serially connected arrangement of timing circuit 32 interconnects clock circuit 23 and terminal 22 for display of the Z axis information on oscilloscope display screen 16. The adjustable device 42 of timing circuit 32 may be a rheostat or variable resistor connected to one-shot multivibrator 40. Device 42 is adjustable for presetting the operation of one-shot multivibrator 40 of timing circuit 32 for a preselected time duration.

In the embodiment thusly described, the count of the signal of clock circuit 23 that was applied to the input of counter 36 is reduced therein by 100,000. The logic gates in logic gate 38 pass only one logic change every 20 milliseconds (corresponding to the intensity modulation period during which the intermediate frequency signal C is fed from the signal receiver to the phase detectors) and the output from logic gate 38 is fed to one shot multivibrator 40.

The output of one-shot multivibrator 40 and, thus, of timing circuit 32 is connected to terminal 22 for the Z axis information on the oscilloscope display screen 16 and is operable for the time duration when the one shot pulse is preselected by adjustment of variable resistor 42 to vary the intensity of a preselected part of the display screen.

Representative patterns are generated on the oscilloscope screen representing the type of noise, the presence of doppler shift or CW interference, and the inherent nature of the incoming signal. Such patterns are capable of visually aiding the receiving terminal operator in determining the nature and noise environment of the incoming signal.

Figures 3, 4, 5:
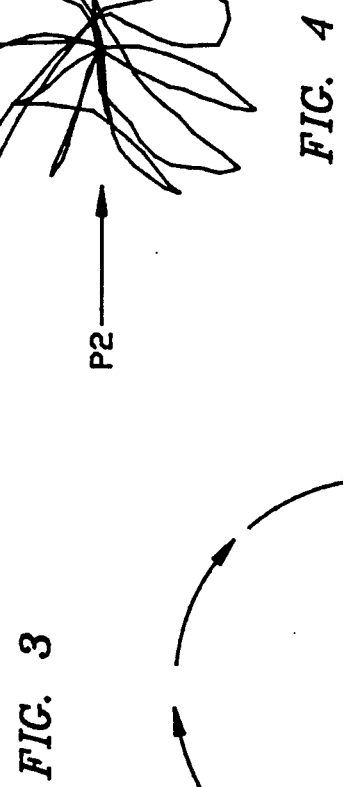
FIG. 3 is a representation of a pattern generated on a screen of an oscilloscope when a signal of interest is being received (no interference or noise).
FIG. 4 is a representation of a noise pattern generated on the screen of the oscilloscope.
FIG. 5 is a representation of a CW interference pattern generated on the screen of the oscilloscope.

FIGS. 3 through 5 show typical representative patterns P(1) to P(3) displayed on oscilloscope display screen 16. A so-called normal pattern P(1) of an intermediate frequency of interest C, such as shown in FIG. 3, and appears as the intensified sections S of the pattern. This pattern should remain in a constant position. If the pattern of the intensified sections S rotates, then a doppler shift is present. The greater the speed of rotation, the greater the doppler shift. If the intensity of the pattern of the intensified sections S constantly and repetitively varies, a frequency drift in the time standard of the distant transmitter clock is indicated. Frequency locked coherent signals would not show such drift.

FIG. 4 is representative of a visual indication of a pattern P(2) of Gaussian noise that is much greater than the intermediate frequency signal of interest coming from signal receiver 12. This distinctive pattern appears as a number of haphazard loops that pass through the center of the oscilloscope screen.

FIG. 5 is representative of a visual indication of the pattern P(3) which is produced by CW interference with a small offset frequency. The small cluster of a sub-pattern that resembles a smaller version of the pattern P(2) rotates in orbit around the center of the oscilloscope screen. The arrows point in the direction of positive offset frequency. The greater the offset, the greater the rate of revolution.

The invention and many of its attendant advantages will be understood from the foregoing description and it will be apparent that various changes may be made in the form, construction and arrangement of the parts thereof without departing from the spirit and scope of the invention.

I claim:

1. An apparatus for visually aiding a receiving terminal operator in determining the nature and noise environment of an incoming signal by visually displaying patterns thereof comprising:

means for providing synchronization;

a signal receiver means having a first receiver input coupled to the synchronization providing means and a second receiver input receiving an incoming signal of interest for producing a signal of interest at a receiver output;

means for providing a display on X, Y and Z axes having an X deflection signal input, a Y deflection signal input and a Z deflection signal input;

generating means having a generating means input coupled to said synchronization providing means and a generating means output, said generating means output being connected to said Z deflection signal input of the display providing means for generating a timing signal of a preselected time duration to vary the intensity of a preselected part of said display providing means;

a pair of phase detectors each having a first phase detector input and a second phase detector input and a phase detector output, said first phase detector input of both of said pair of phase detectors being connected to said receiver output of said receiver, said phase detector output of one phase detector being connected to said X deflection signal input of said display providing means and said phase detector output of the other phase detector being connected to said Y deflection signal input of said display providing means;

a reference signal circuit means coupled to said synchronizing means for providing a reference intermediate signal that is substantially the same as said frequency of interest from said receiver coupled to said second phase detector input said one of the said pair of phase detectors, the reference signal circuit means includes an analog delay means to provide a phase delayed reference intermediate signal coupled to said second phase detector input of said other of said pair of phase detectors to thereby assure that patterns are visually displayed on said display defining means.

2. The apparatus according to claim 1 in which said analog delay means is an analog delay line suitably tailored to provide an appropriate delay for a particular reference intermediate signal.

3. The apparatus according to claim 2 in which said analog delay means is an analog delay line suitably tailored to provide a 90° shift.

4. The apparatus according to claim 3 in which said generating means has a timing circuit that includes a counter, logic gates and a one-shot multivibrator connected in a serial arrangement between said synchronizing means and said Z deflection signal input of said display providing means.

5. The apparatus according to claim 4 in which said generating means includes an adjustable means for presetting said preselected time duration of operation of said timing signal.

6. The apparatus according to claim 5 in which said adjustable means is a variable resistor, the changing of the magnitude of which modifies the intensity of the image on said display providing means.

7. The apparatus of claim 6 in which said pair of phase detectors are two exclusive-OR circuits.

8. The apparatus according to claim 7 wherein said display providing means is an oscilloscope having a display screen.

9. The apparatus according to claim 8 in which said synchronizing means is a frequency time standard clock circuit.

* * * * *